(12) United States Patent
Mimura

(10) Patent No.: US 7,204,778 B1
(45) Date of Patent: Apr. 17, 2007

(54) DIFFERENTIAL GEAR

(76) Inventor: Kenji Mimura, 29-1105, Wakabadai 4-chome, Asahi-ku,Yokohama-shi, Kanagawa 241-0801 (JP)

( * ) Notice: Subject to any disclaimer, the term of this patent is extended or adjusted under 35 U.S.C. 154(b) by 209 days.

(21) Appl. No.: 11/104,482

(22) Filed: Apr. 13, 2005

(51) Int. Cl.
*F16H 48/06* (2006.01)

(52) U.S. Cl. ...................................... 475/225; 427/231

(58) Field of Classification Search ............... 475/225, 475/231, 249
See application file for complete search history.

(56) References Cited

U.S. PATENT DOCUMENTS 1,632,787 A * 6/1927 Crawford ................. 475/231
5,370,588 A * 12/1994 Sawase et al. ............. 475/84
5,910,064 A * 6/1999 Kuroki ..................... 475/199
6,120,407 A * 9/2000 Mimura .................... 475/225

* cited by examiner

*Primary Examiner*—Ha Ho
(74) *Attorney, Agent, or Firm*—Lowe, Hauptman & Berner, LLP

(57) ABSTRACT

A differential gear arbitrarily produces difference in speed of rotation between output side rotary members. When a difference in speed of rotation occurs between drive shafts 3 and 4, if clutches 12 and 17 are disconnected, the drive shaft 3 rotates independently of the first output side gear 9, and the drive shaft 4 rotates independently of the second output side gear 14. When the rotation of the drive shaft 3 with respect to the first output side gear 9 is controlled by the first clutch 12, by setting appropriately the gear ratios between (1) the first input side gear 8, (2) the first output side gear 9 and (3) the first intermediate gears 10, the drive shaft 3 rotates faster than the drive shaft 4.

3 Claims, 2 Drawing Sheets

DIFFERENTIAL GEAR

BACKGROUND OF THE INVENTION (i) Field of the Invention

The present invention relates to a differential gear for permitting a difference in speed of rotation between right and left driving wheels of a motor vehicle for instance.

(ii) Description of the Related Art

A differential gear for the motor vehicle is a unit for permitting a difference in speed of rotation between right and left driving wheels which may occur when the motor vehicle is moving in a curve, or a difference in speed of rotation between front and rear driving wheels of a motor vehicle with four-wheel drive. A typical arrangement of the differential gear is such that a pinion gear intervenes between a pair of bevel gears coupled to output shafts, and that when an external rotational force is applied to the pinion gear shaft, the pinion gear rotates on its own axis at the time of occurrence of a differential motion so as to permit a difference in speed of rotation between the output shafts.

By the way, when the motor vehicle turns along a curve, a difference in speed of rotation occurs between the inner wheel and the outer wheel is permitted by the above-described differential gear, the difference in speed of rotation being caused attendantly as a result of a frictional force between the wheels and the surface of a road. It is thus possible to enhance the turning performance or the high-speed stability by positively generating the difference in speed of rotation between the driving wheels. If, for instance, the left-hand wheel is rotated faster than the ordinary rotational speed upon a rightward turning, then the handling operation for turning will be facilitated. Also, when the motor vehicle is subjected to a strong lateral wind upon a straight movement, if the wheel on the downwind side is rotated faster than the wheel on the opposite side, the automobile can be prevented from being transversely urged without any extreme handling operation. Accordingly, the realization of such a unit with a simple structure would be very effective in enhancing the performance of the motor vehicles.

SUMMARY OF THE INVENTION

The present invention was conceived in view of the above problems. It is therefore an object of the present invention to realize with a simple structure a differential gear capable of arbitrarily generating a difference in speed of rotation between output side rotary members.

In order to achieve the above object, according to a first aspect of the present invention, there is provided a differential gear having an input side rotary member for receiving an external driving force, a pair of output side rotary members arranged coaxially with the rotational axis of the input side rotary member, and a gear body for free-rotatably supporting the input side rotary member and the output side rotary members, with a rotational force of the input side rotary member being transmitted to the output side rotary members while permitting a difference in speed of rotation between the output side rotary members, said differential gear further comprising a first output side gear having a deceleration ratio larger or smaller relative to said first input side gear, said first output side gear revolving about a rotational axis of one of said output side rotary members; a second output side gear having a deceleration ratio larger or smaller relative to said second input side gear, said second output side gear revolving about a rotational axis of the other said output side rotary member; at least one first intermediate gear free-rotatably supporting by the gear body, said first intermediate gear meshing with said first input side gear and said first output side gear; at least one second intermediate gear free-rotatably supporting by the gear body, said second intermediate gear meshing with said second input side gear and said second output side gear; a first clutch for controlling with an arbitrary controlling force a relative rotation of one of said output side rotary members respect to said first output side gear; and a second clutch for controlling with an arbitrary controlling force a relative rotation of the other said output side rotary member respect to said second output side gear.

Thus, when a difference in speed of rotation occurs between the output side rotary members, if the first clutch and second clutch are disconnected, then one of said output side rotary members is allowed to rotate independently of said first output side gear, and the other said output side rotary member is allowed to rotate independently of said second output side gear. When the rotation of one of output side rotary members respect to the first output side gear is controlled by the first clutch, with the result that by setting appropriately the gear ratios between the first input side gear, the first output side gear and the first intermediate gears, one of the output side rotary members for instance can be controlled to rotate faster or later than the other output side rotary members. On the contrary, when the rotation of the other output side rotary member respect to the second output side gear is controlled by the second clutch, with the result that by setting appropriately the gear ratios between the second input side gear, the second output side gear and the second intermediate gears, the other output side rotary member for instance can be controlled to rotate faster or later than one of output side rotary members.

Thus, according to the present invention, there can be realized with the simple structure the differential gear capable of arbitrarily generating a difference in speed of rotation between the output side rotary members, whereby the turning performance can be enhanced by rotating the outside driving wheel faster than the inside driving wheel in a curve when a motor vehicle turns for instance, which will remarkably contribute to an improvement in performance of the motor vehicle.

BRIEF DESCRIPTION OF THE DRAWINGS

The above and other objects, aspects, features and advantages of the present invention will become more apparent from the following detailed description with reference to the accompanying drawings, in which.

DESCRIPTION OF THE PREFERRED EMBODIMENTS

Figure 1:
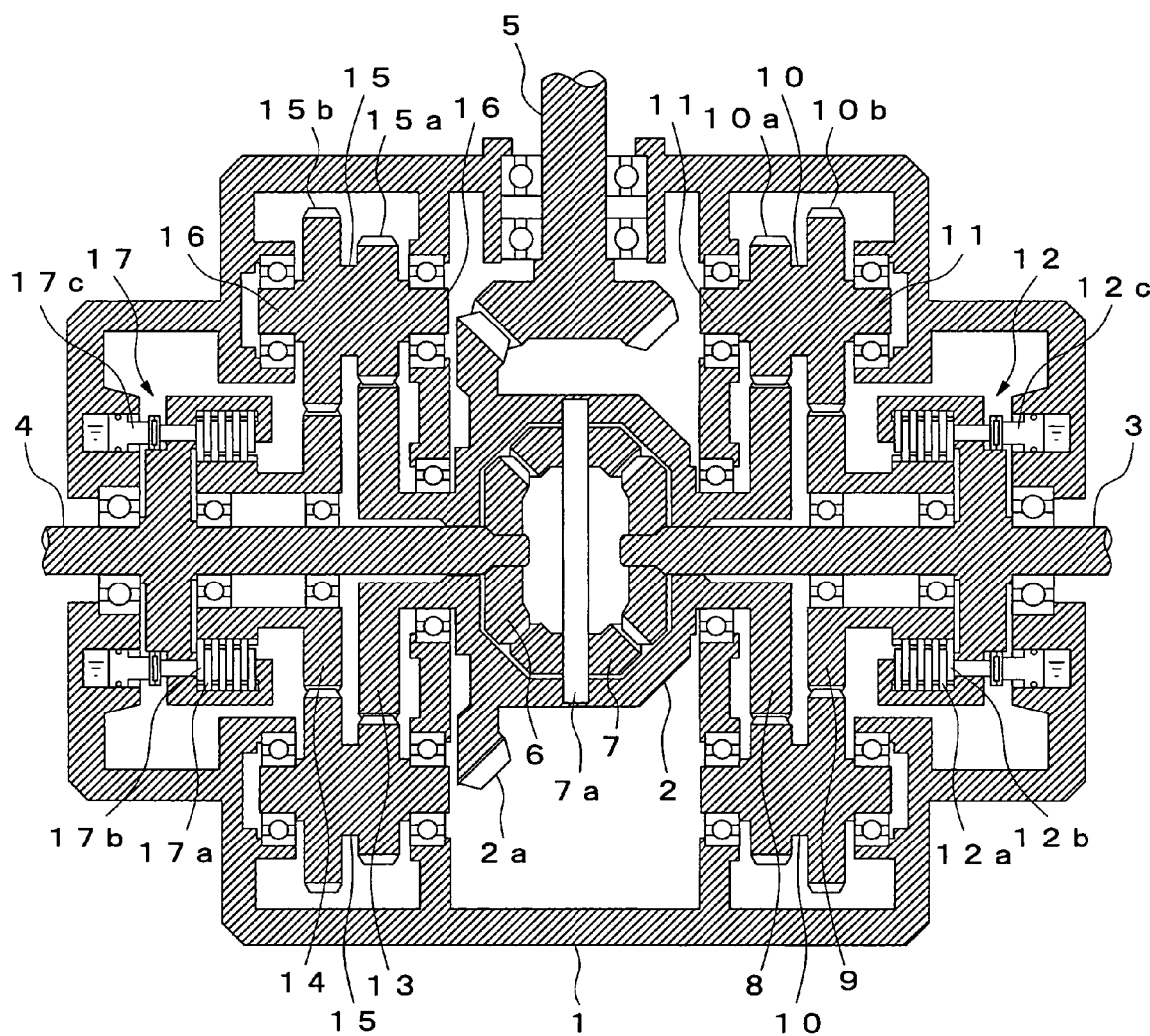
FIG. 1 is a sectional side elevation of a embodiment of a differential gear in accordance with the present invention.
Figure 2:
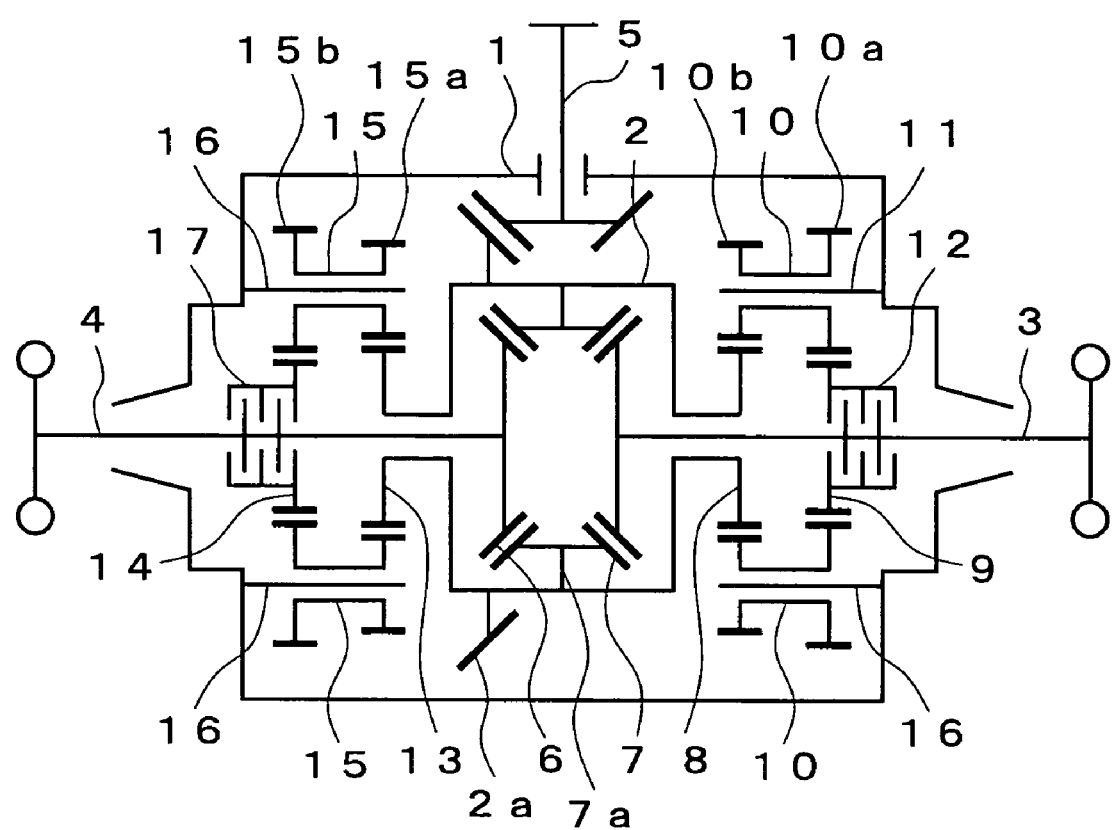
FIG. 2 is a schematic view of the differential gear shown in FIG. 1.

FIG. 1 and FIG. 2 illustrates a embodiment of a differential gear in accordance with the present invention, the differential gear being interposed between right and left driving wheels of a motor vehicle.

The differential gear of this embodiment comprises a gear body 1 fixedly secured to a vehicle body, a gear case 2 receiving a driving force from a vehicle engine, and a pair of drive shafts 3 and 4 arranged coaxially with a rotational axis of the gear case 2. A rotational force of the gear case 2 is transmitted to the drive shafts 3 and 4 while permitting a difference in speed of rotation between the drive shafts 3 and 4. In this case, the drive shaft 3 on one hand is coupled to the right-hand driving wheel of the vehicle, and the drive shaft 4 on the other is coupled to the left-hand drive shaft of the vehicle.

More specifically, the gear case 2 includes a ring gear 2a which in rotation engages with a propeller shaft 5 rotated by a driving force from the engine. The drive shafts 3 and 4 have at their respective one ends their respective bevel gears 6 which are engaged with each other by way of a plurality of pinion gears 7. In this case, each pinion gear 7 is supported by a pinion shaft 7a fixedly secured to the gear case 2 and rotates jointly with the gear case 2.

On one end side of the gear case 2 there are provided a first input side gear 8 rotating jointly with the gear case 2, a first output side gear 9 rotating jointly with the drive shaft 3 on one hand, a plurality of first intermediate gears 10 engaging with the gears 8 and 9, a plurality of first shafts 11 provided with the first intermediate gears 10, and a first clutch 12 for controlling the rotation of a relative rotation of the drive shaft 3 respect to the first output side gear 9. The first input side gear 8 and the first output side gear 9 are so formed as to be different in size from each other, with each of the first intermediate gears 10 axially integrally including gears 10a and 10b engaging with the gears 8 and 9. The first shafts 11 are provided with both end side of the first intermediate gear 10, the first shafts 11 are free-rotatably supporting by the gear body 1. The first clutch 12 is interposed between the drive shaft 3 and the first output side gear 9. The first clutch 12 includes a plurality of friction plates 12a rotating jointly with the drive shaft 3, a plurality of friction plates 12a rotating jointly with the first output side gear 9, and a hydraulic cylinder 12c for pressure bonding the friction plates 12a and 12b to each other with an arbitrary pressing force.

On the other end side of the gear case 2 there are provided a second input side gear 13 rotating jointly with the gear case 2, a second output side gear 14 rotating jointly with the drive shaft 4 on the other, a plurality of second intermediate gears 15 engaging with the gears 13 and 14, a plurality of second shafts 16 provided with the second intermediate gears 15, and a second clutch 17 for controlling the rotation of a relative rotation of the drive shaft 4 respect to the second output side gear 14. The second input side gear 13 and the second output side gear 14 are so formed as to be different in size from each other, with each of the second intermediate gears 15 axially integrally including gears 15a and 15b engaging with the gears 13 and 14. The second shafts 16 are provided with both end side of the second intermediate gear 15, the second shafts 16 are free-rotatably supporting by the gear body 1. The second clutch 17 is interposed between the drive shaft 4 and the second output side gear 14. The second clutch 17 includes a plurality of friction plates 17a rotating jointly with the drive shaft 4, a plurality of friction plates 17b rotating jointly with the second output side gear 14, and a hydraulic cylinder 17c for pressure bonding the friction plates 17a and 17b to each other with an arbitrary pressing force.

In the above configuration, when the gear case 2 receives an driving force from the engine by way of the propeller shaft 5, the gear case 2 rotates coaxially with the drive shafts 3 and 4, and a rotational force of the gear case 2 is transmitted via the pinion gears 7 and the bevel gears 6 to the drive shafts 3 and 4. At that time, if a difference in speed of rotation occurs between the drive shafts 3 and 4 for example when a motor vehicle runs along a curve, then the pinion gears 7 rotate on their own axes to permit the difference in speed of rotation between the drive shafts 3 and 4. In this case, if the clutches 12 and 17 are disconnected, the drive shaft 3 is allowed to rotate independently of the first output side gear 9, and the drive shaft 4 is allowed to rotate independently of the second output side gear 14. When the rotation of the drive shaft 3 respect to the first output side gear 9 is controlled by the first clutch 12, with the result that by setting appropriately the gear ratios between the first input side gear 8, the first output side gear 9 and the first intermediate gears 10, the drive shaft 3 for instance can be controlled to rotate faster than the drive shaft 3. On the contrary, when the rotation of the drive shaft 4 respect to the second output side gear 14 is controlled by the second clutch 17, with the result that by setting appropriately the gear ratios between the second input side gear 13, the second output side gear 14 and the second intermediate gears 15, the drive shaft 4 for instance can be controlled to rotate faster than the drive shaft 4.

Also, by controlling the rotation of the drive shaft 3 and 4 by an arbitrary controlling force with the first clutch 12 or the second clutch 17 being in half-connection, the drive shafts 3 and 4 can rotate at an arbitrary speed ratio which is smaller than the clutch 12 or 17 is fixed.

Accordingly, it becomes possible to enhance the turning performance by sensing the speed of the motor vehicle, the steering angle, the forward/backward and rightward/leftward accelerations, etc., by means of a sensor not shown and by, on the basis of the information, connecting the first clutch 12 when the motor vehicle turns to left for example, to allow the left-hand driving wheel to rotate faster than the case of an ordinary difference in speed of rotation relative to the right-hand driving wheel.

While the invention has been described in connection with preferred embodiments, it is not intended to limit the scope of the invention to the particular forms set forth, but on the contrary, it is intended to cove such alternatives, modifications and equivalents as may be included within the spirit and scope of the invention as defined by the appended claims.

What is claimed is:

1. A differential gear having an input side rotary member for receiving an external driving force, a pair of output side rotary members arranged coaxially with the rotational axis of the input side rotary member, and a gear body for free-rotatably supporting the input side rotary member and the output side rotary members, with a rotational force of the input side rotary member being transmitted to the output side rotary members while permitting a difference in speed of rotation between the output side rotary members, said differential gear comprising:

a first input side gear disposed on said input side rotary member at its one end side in the axial direction, said first input side gear rotating jointly with said input side rotary member;

a second input side gear disposed on said input side rotary member at its other end side in the axial direction, said second input side gear rotating jointly with said input side rotary member;

a first output side gear having a deceleration ratio larger or smaller relative to said first input side gear, said first output side gear revolving about a rotational axis of one of said output side rotary members;

a second output side gear having a deceleration ratio larger or smaller relative to said second input side gear, said second output side gear revolving about a rotational axis of the other said output side rotary member;

at least one first intermediate gear free-rotatably supporting by the gear body, said first intermediate gear meshing with said first input side gear and said first output side gear;

at least one second intermediate gear free-rotatably supporting by the gear body, said second intermediate gear meshing with said second input side gear and said second output side gear;

a first clutch for controlling with an arbitrary controlling force a relative rotation of one of said output side rotary members respect to said first output side gear; and a second clutch for controlling with an arbitrary controlling force a relative rotation of the other said output side rotary member respect to said second output side gear.

2. A differential gear according to claim 1, wherein:

said first clutch includes a plurality of friction plates rotating jointly with one of said output side rotary members, a plurality of friction plates rotating jointly with said first output side gear, and a hydraulic cylinder for pressure bonding the friction plates to each other with an arbitrary pressing force.

3. A differential gear according to claim 1, wherein:

said first clutch includes a plurality of friction plates rotating jointly with the other said output side rotary member, a plurality of friction plates rotating jointly with said second output side gear, and a hydraulic cylinder for pressure bonding the friction plates to each other with an arbitrary pressing force.

* * * * *